(12) United States Patent
Weindorf et al.

(10) Patent No.: US 10,359,016 B2
(45) Date of Patent: Jul. 23, 2019

(54) WATER SEPARATOR WITH A WATER OVERFLOW SECURED BY MEANS OF A FLOAT VALVE

(71) Applicant: MANN+HUMMEL GMBH, Ludwigsburg (DE)

(72) Inventors: Martin Weindorf, Kornwestheim (DE); Rafael Salom, Remseck (DE); Pius Trautmann, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 106 days.

(21) Appl. No.: 15/530,919

(22) Filed: Mar. 20, 2017

(65) Prior Publication Data
US 2017/0218896 A1 Aug. 3, 2017

Related U.S. Application Data

(63) Continuation of application No. PCT/EP2015/069129, filed on Aug. 20, 2015.

(30) Foreign Application Priority Data

Sep. 19, 2014 (DE) .................. 10 2014 013 628

(51) Int. Cl.
*F02M 37/22* (2019.01)
*B01D 36/00* (2006.01)
(Continued)

(52) U.S. Cl.
CPC ......... *F02M 37/24* (2019.01); *B01D 17/0214* (2013.01); *B01D 35/153* (2013.01); *B01D 36/005* (2013.01)

(58) Field of Classification Search
CPC .............. F02M 37/221; B01D 17/0214; B01D 36/005; B01D 36/006; Y10S 210/05
See application file for complete search history.

(56) References Cited

U.S. PATENT DOCUMENTS

| 4,384,962 A | * | 5/1983 | Harris | ............... B01D 17/0208 210/788 |
| 5,705,056 A | | 1/1998 | Scragg | |

(Continued)

FOREIGN PATENT DOCUMENTS

| DE | 3217162 A1 | 11/1983 |
| DE | 102008022406 A1 | 11/2009 |

(Continued)

*Primary Examiner* — Terry K Cecil
(74) *Attorney, Agent, or Firm* — James Hasselbeck

(57) ABSTRACT

A water separator for water contained in fuel has a water separator housing with a separator element. A water collecting chamber is arranged in operation of the water separator below the separator element. A water collecting chamber through opening fluidically connects the water collecting chamber with the separator element. A drainage through opening has a first end which leads, for draining water from the water separator, out of the water separator. A second end is connected fluidically by an overflow valve to the water collecting chamber. The overflow valve has a float closing off a connection between drainage through opening and water collecting chamber when a water filling level has not reached the overflow valve. The float has an average density of 700 kg/m³ to 1,000 kg/m³ so that the float, when the water filling level is reached, opens the connection between water collecting chamber and drainage through opening.

10 Claims, 4 Drawing Sheets

(51) Int. Cl.
    *B01D 17/02*     (2006.01)
    *F02M 37/24*     (2019.01)
    *B01D 35/153*     (2006.01)

(56) References Cited

U.S. PATENT DOCUMENTS

| | | |
|---|---|---|
| 6,783,665 B1 | 8/2004 | Girondi |
| 2011/0000833 A1 | 1/2011 | Eberle |
| 2011/0041920 A1 | 2/2011 | Abdalla |
| 2011/0147290 A1 | 6/2011 | Braunheim |
| 2012/0080386 A1 | 4/2012 | Weindorf et al. |

FOREIGN PATENT DOCUMENTS

| | | | |
|---|---|---|---|
| DE | 202011104600 U1 | 11/2011 | |
| DE | 102010044773 A1 | 3/2012 | |
| EP | 0060106 A2 | 9/1982 | |
| WO | WO-2006080875 A1 * | 8/2006 | ......... F02M 37/0052 |

* cited by examiner

WATER SEPARATOR WITH A WATER OVERFLOW SECURED BY MEANS OF A FLOAT VALVE

CROSS-REFERENCE TO RELATED APPLICATIONS

This application is a continuation application of international application No. PCT/EP2015/069129 having an international filing date of 20 Aug. 2015 and designating the United States, the international application claiming a priority date of 19 Sep. 2014, based on prior filed German patent application No. 10 2014 013 628.0, the entire contents of the aforesaid international application and the aforesaid German patent application being incorporated herein by reference

BACKGROUND OF THE INVENTION

The invention concerns a water separator for water contained in fuel. It is known to configure water separators with a water drainage device. For example, DE 600 26 724 T2 discloses a water-separating fuel filter with a water collecting chamber for separated water. Reaching a maximum filling level of the water in the water collecting chamber is detected by a sensor. A pump of the water separator then pumps the water out of the water collecting chamber.

DE 10 2010 047 354 B3 discloses a further fuel filter system. The known fuel filter system comprises a water drainage line. The fuel filter system comprises a bidirectionally closeable valve that is controllable depending on the pressure of the water drainage line.

It is moreover known to provide water separators for water contained in fuel with a float valve.

For example, DE 20 2011 104 600 U1 and DE 32 17 162 A1 disclose water-separating fuel filters. The separated water collects at the bottom of a filter housing. At this bottom, a drainage valve is arranged which in case of water collection at the bottom opens by means of a ball float.

DE 11 2010 003 359 T5 discloses a fuel filter with a float valve that prevents that fuel enters a water collecting chamber.

DE 10 2008 020 233 A1 discloses a water separator with an evaporation device. The water separator comprises a float valve at the vapor outlet in order to prevent that evaporated diesel oil can reach the environment.

U.S. Pat. No. 5,705,056 A discloses a water separator with an outlet valve. The outlet valve is opened by a float valve upon collection of water.

Finally, EP 0 060 106 A2 discloses a water separator with a drainage labyrinth. Above the drainage labyrinth a separator element is arranged and below the drainage labyrinth a water collecting chamber is arranged. In the drainage labyrinth several balls are provided in order to prevent sinking of fuel into the water collecting chamber and to accelerate sinking of the water.

In the known water separators with a float valve, separator element, water collecting chamber, and a fluidic connection between separator element and water collecting chamber are arranged serially relative to each other wherein the float valve controls the inlet to the water collecting chamber or the outlet from the water collecting chamber. Therefore, only one outflow path out of the water separator is provided for the separated water. When this one outflow path fails, for example, because the water collecting chamber is full and a maintenance signal is ignored, failure of the water separator occurs.

WO 2010/020489 A1 discloses in this context a water separator with a water collecting chamber provided at the bottom with a water outlet and at the top with a fuel outlet so that, even in case of a full water separator, the latter can continue to operate. In WO 2010/020489 A1 the water collecting chamber however operates as a separator element with calmed flow. Due to the return of fuel, a certain current is thus caused.

SUMMARY OF THE INVENTION

It is therefore the object of the invention to provide a water separator with a significantly improved efficiency that, in absence of drainage of the water collecting chamber, still will not fail.

The object according to the invention is therefore solved by a water separator for water contained in fuel, comprising:
a) a water separator housing;
b) a separator element arranged in the water separator housing;
c) a water collecting chamber which, in operation of the water separator, is arranged below the separator element and which is fluidically connected with the separator element by a water collecting chamber through opening;
d) a drainage through opening which leads, for draining water from the water separator, with one end out of the water separator and with the other end is connected fluidically by an overflow valve with the water collecting chamber;
e) a float in the overflow valve for closing off the drainage through opening, wherein the average density of the float amounts to more than 700 kg/m$^3$ and less than 1,000 kg/m$^3$ so that the float upon reaching the water filling level at the overflow valve opens the connection between water collecting chamber and drainage through opening.

By means of the float, the overflow valve is opened only by water but not by fuel. The efficiency of the water separator is thus significantly improved. At the same time, due to the water drainage by means of the overflow valve, the function of the water separator is ensured even when drainage of the filled water collecting chamber is not carried out. Moreover, the water separator according to the invention protects an injection system of a motor vehicle when splashing water out of the tank is sucked into the water separator because the overflow valve prevents water from being pulled through to the injection system. The injection system is therefore protected against corrosion.

The average density of the float of more than 700 kg/m$^3$ and less than 1,000 kg/m$^3$ corresponds to the density of the fuel used in motor vehicles. Preferably, the average density of the float is more than 819 kg/m$^3$ and less than 1,000 kg/m$^3$. The float in this case is lifted by water but not by diesel fuel. Particularly preferred, the average density of the float is more than 875 kg/m$^3$ and less than 885 kg/m$^3$.

The drainage through opening can branch off the water collecting chamber through opening in the overflow valve. In this case, the water separator is of a particularly simple construction.

The float can be embodied to be inhomogeneous. For example, the float can comprise a core of a first material and an envelope of another material. In order to simplify the manufacture of the float, the float however preferably is comprised of a single material with a homogenous density. The float can be produced particularly simply when it is made of polypropylene.

The overflow valve is of a particularly simple construction when the float is spherical. In this case, no guide for orientation of the float must be provided.

The manufacture of the water separator is further simplified when the overflow valve comprises a valve seat with a sealing surface whose geometry is at least partially complementary to the exterior side of the float. Preferably, the sealing surface is embodied in the form of a partial spherical surface for receiving a spherical float.

The valve seat can be formed in the water separator housing. In this case, the drainage through opening is formed at least partially in the water separator housing.

Alternatively, the valve seat can be embodied as an insert member of the overflow valve wherein the insert member is connected with the water separator housing. By means of the insert member, complex configurations or milled-out parts of the water separator housing are avoided so that the production of the water separator can be significantly simplified. In this case, the drainage through opening is formed at least partially in the insert member.

The insert member is preferably fastened by means of at least one threaded connection to the water separator housing. Alternatively or additionally, the insert member can be fastened by radial pressing grooves in the water separator housing.

In order to minimize the risk of faulty actuation of the overflow seat, the water collecting chamber through opening between water collecting chamber and float can have a cross-sectional surface area of less than 7 mm$^2$, a baffle and/or a labyrinth.

The overflow valve can be arranged above the ceiling of the water collecting chamber.

In a further embodiment of the invention, the water separator housing may comprise an annular channel between the separator element and the water collecting chamber, wherein the overflow valve is connected fluidically with the annular channel and is arranged between the separator element and the water collecting chamber.

The annular channel can be embodied to be partially closed relative to the water collecting chamber.

Particularly preferred, the water separator comprises in addition to the drainage through opening a water discharge device for at least partial drainage of the water collected in the water collecting chamber. The "usual" drainage of the water collecting chamber is realized therefore by means of the water discharge device. The water discharge device is preferably arranged or embodied below the water collecting chamber in operation of the water separator so that water out of the water collecting chamber can be drained without a pump from the water collecting chamber.

In a particularly preferred embodiment of the invention, the water discharge device in operation of the water separator is arranged below the overflow valve. Further preferred, the water discharge device in operation of the water separator is arranged below the drainage through opening.

The water discharge device may comprise in this context a discharge opening in the bottom area of the water collecting chamber.

Alternatively or additionally thereto, the water discharge device can comprises a discharge channel by means of which water collected in the water collecting chamber can be discharged upwardly through the water separator, wherein the discharge channel at least partially is formed in the water separator housing and/or in the separator element.

Particularly preferred, the water separator comprises a fuel tank and a return line that is connected fluidically with the fuel tank, wherein the discharge through opening is connected fluidically with the return line. The discharge through opening opens thus finally in the fuel tank. A water discharge for the water that is discharged via the discharge through opening is not required in this case.

In a further preferred embodiment of the invention, the water separator comprises a water level sensor for detecting the water filling level in the water separator. The water level sensor is preferably arranged in the water collecting chamber. The manufacture of the water separator is simplified when the water level sensor is arranged centrally on the longitudinal axis of the water separator.

Preferably, the water level sensor is arranged in operation of the water separator below the overflow valve, particularly preferred below the discharge through opening.

The separator element may comprise a screen pipe and a support pipe between which a water separating gap is formed, wherein the water separating gap is connected fluidically with the water collecting chamber.

In order to increase the water separation rate, the separator element preferably comprises a coalescing medium.

Further preferred, the separator element comprises a filter medium in order to filter dirt out of the fuel in addition to water separation.

BRIEF DESCRIPTION OF THE DRAWINGS

Further features and advantages of the invention can be taken from the following detailed description of several embodiments of the invention, from the figures of the drawing showing details important to the invention, as well as from the claims.

The features illustrated in the drawing are illustrated such that the particularities according to the invention can be made visible clearly. The various features can be realized individually by themselves or several of them in any combination in variants of the invention.

DESCRIPTION OF PREFERRED EMBODIMENTS

Figure 1:
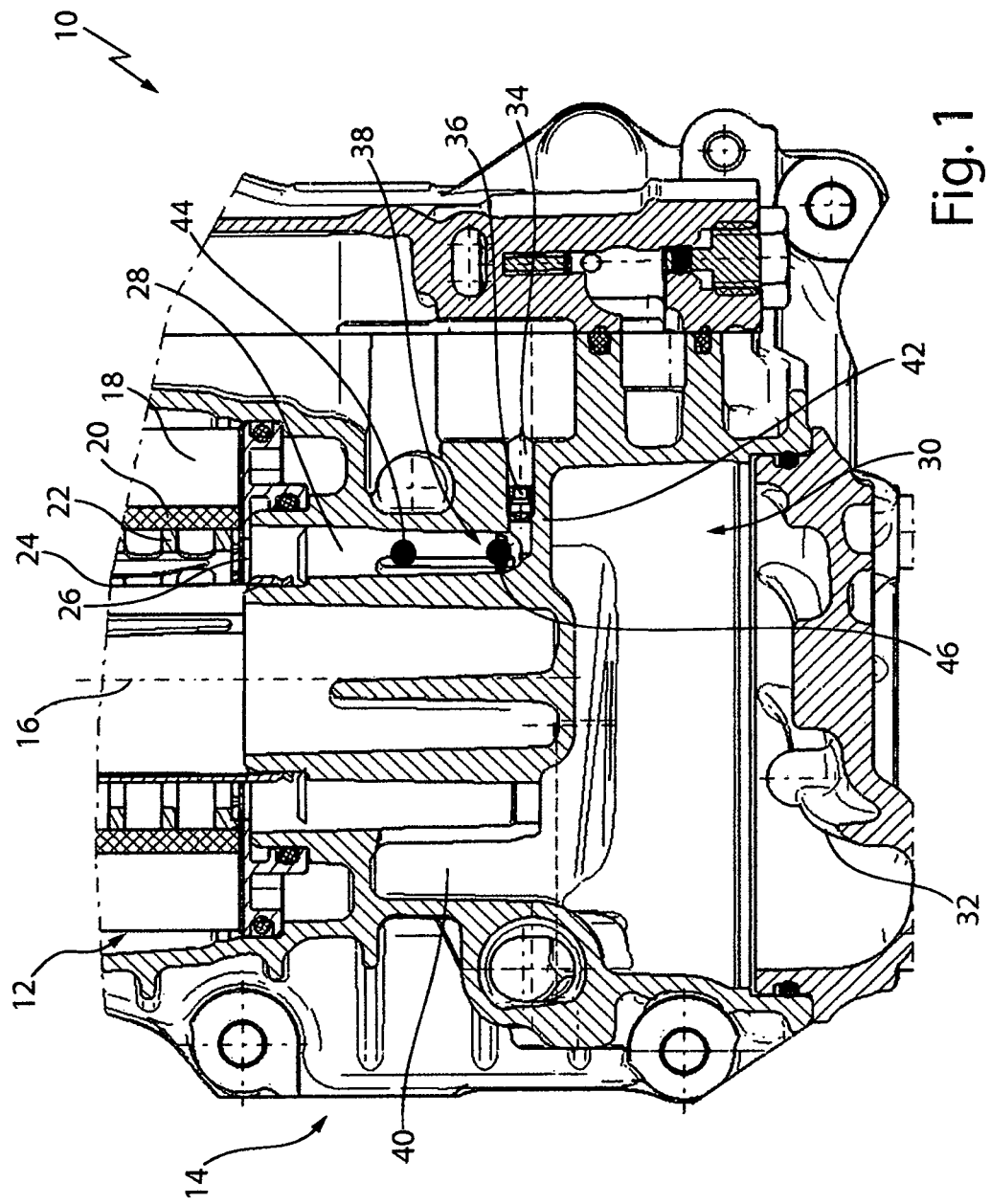
FIG. 1 is a section view of a first embodiment of a water separator with a water separator housing and an overflow valve, wherein a valve seat of the overflow valve is formed in the water separator housing.

FIG. 1 shows a water separator 10 in the form of a fuel filter. The water separator 10 comprises a separator element 12. The separator element 12 is arranged in a water separator housing 14.

The separator element 12 is in the form of a filter element, more precisely in the form of a round filter element. In this context, the separator element 12 is embodied substantially with axial symmetry to its central filter element longitudinal axis 16. The separator element 12 comprises a filter medium 18 for separating dirt from the fuel. The filter medium 18 has arranged fluidically downstream thereof a coalescing medium 20. On the coalescing medium 20, water droplets of the water contained in and to be separated from the fuel ale formed. The coalescing medium 20 is supported radially, i.e., perpendicular to the central filter element longitudinal axis 16, on a support pipe 22. Radially inwardly displaced relative to the support pipe 22, the separator element 12 has a screen pipe 24. Between support pipe 22 and screen pipe 24, there is a water separating gap 26.

The water separated at the separator element 12 flows through the water separating gap 26 farther through a water collecting chamber through opening 28 into a water collecting chamber 30. The water separated from the fuel collects thus in the water collecting chamber 30. Reaching a predefined filling level of water in the water collecting chamber 30 is detectable by water level electrodes (not shown) of the water separator 10. Detection of reaching the predefined filling level of the water collecting chamber 30 triggers a service message. The water separated from the fuel can then be drained in a shop by means of a water discharge device (not shown) in the bottom area 32 of the water collecting chamber 30. The water discharge device is in this context preferably in the form of a stopper, a tap, or a valve.

When the water collecting chamber 30 is not emptied, in most known water separators damage of the water separator is caused by a water level that continues to rise. In this context, freezing of water in the water separator may occur and/or water may "break through" into an injection system causing corrosion effects in the injection system. Alternatively, the ignored service signal can be associated with shutting down the combustion engine operated with the fuel.

In contrast to this, the water separator according to the invention can continue to operate safely even in case of an ignored service signal. For this purpose, the water separator 10 comprises a drainage through opening 34. In the drainage through opening 34 a throttle 36 is arranged in order to regulate the drainage quantity. The throttle 36 is designed in the form of a press-fit throttle. The drainage through opening 34 is connected fluidically with one end with a fuel tank (not shown) and with the other end with an overflow valve 38.

The overflow valve 38 is arranged in an annular channel 40 of the water separator housing 14. The annular channel 40 at the bottom side is embodied to be at least partially closed by a ceiling 42 of the water collecting chamber 30.

The overflow valve 38 is illustrated only schematically in FIG. 1. It comprises a float 44. The float 44 is spherical. In FIG. 1, the float 44 is shown in an upper position (it is identified in FIG. 1 by reference character 44) and in a lower position. The lower position of the float 44 corresponds to the position of the float 44 "in usual operation", i.e., without overfull water collecting chamber 30. The float 44 is seated in this state in a valve seat 46 of the overflow valve 38 and seals the drainage through opening 34 relative to the water collecting chamber through opening 28.

The float 44 has an average density between 700 kg/m$^3$ and 800 kg/m$^3$. The float 44 is therefore lighter than water and heavier than diesel fuel. The float 44 therefore does not rise in diesel fuel, while it will rise with increasing water level and open the fluidic connection of the overflow valve 38 between the water collecting chamber through opening 28 and the drainage through opening 34 so that the water can drain via the drainage through opening 34. As a result, through the drainage through opening 34 no fuel flows out of the water separator 10 back into the fuel tank.

Figure 2:
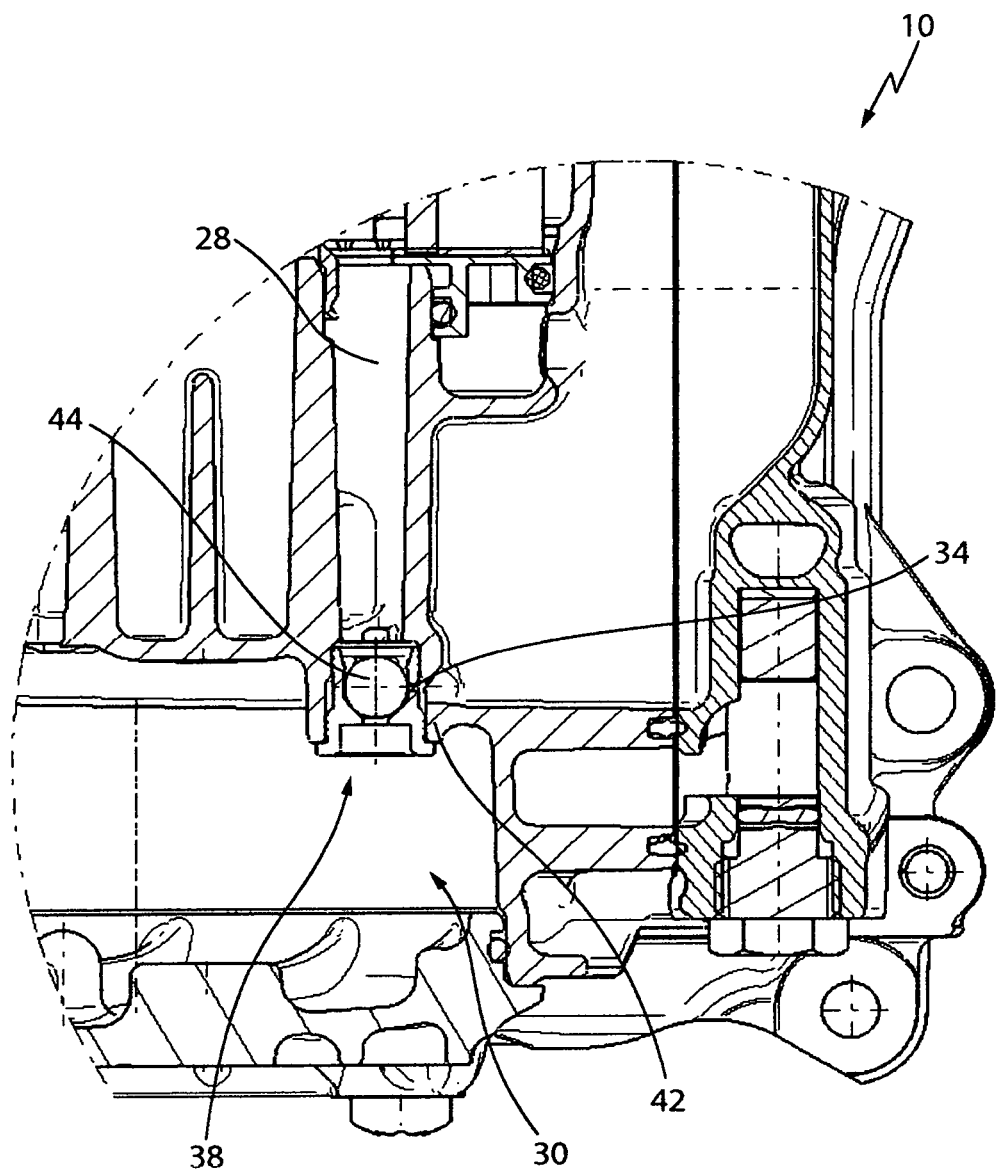
FIG. 2 is a section view of a second embodiment of a water separator with an overflow valve, wherein a valve seat of the overflow valve is formed in an insert member.

FIG. 2 shows a part of a further water separator 10. The water separator 10 comprises an overflow valve 38 that is arranged fluidically between a water collecting chamber through opening 28 and a water collecting chamber 30. The overflow valve 38 is connected furthermore with a drainage through opening 34. The overflow valve 38 is fastened in the ceiling 42 of the water collecting chamber 30. A float 44 of the overflow valve 38 is positioned above the ceiling 42 in the operating state of the water separator 10.

Figure 3:
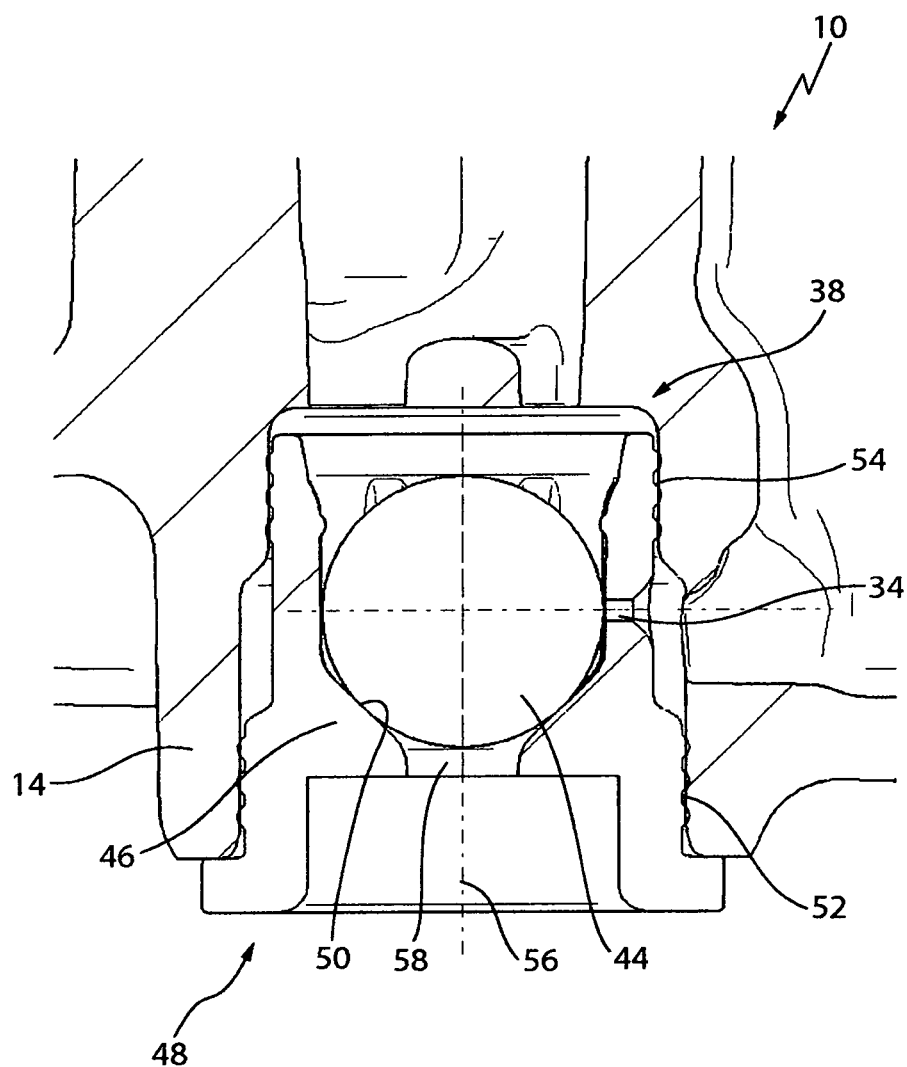
FIG. 3 is an enlarged illustration of the overflow valve of FIG. 2.

FIG. 3 shows a greatly enlarged illustration of the water separator 10 of FIG. 2. FIG. 3 illustrates that the overflow valve 38 is designed in a constructively particularly simple configuration in that it has an insert member 48 in which a valve seat 46 with a sealing surface 50 for the float 44 is formed. The valve seat 46 therefore, in contrast to the embodiment of the water separator 10 according to FIG. 1, must not be embodied within the water separator housing 14. The insert member 48 is fastened by a first thread connection 52 and a second thread connection 54 to the water separator housing 14. Alternatively or additionally, the insert member 48 can be fastened by radial pressing grooves (not shown) in the water separator housing 14.

The insert member 48 comprises in the direction of its central longitudinal axis 56 a first through opening 58 which with one end is fluidically connected with the water collecting chamber through opening 28 and with the other end with the water collecting chamber 30. In the insert member 48, transverse to the direction of its longitudinal axis 56, in particular perpendicular to the direction of its longitudinal axis 56, a drainage through opening 34 is formed. According to FIG. 3, the drainage through opening 34 is closed off by the float 44. Rising of the float 44 in backed-up water effects however a fluidic connection between the first through opening 58 and the drainage through opening 34 so that water can drain from the water collecting chamber 30 (see FIG. 2).

Figure 4:
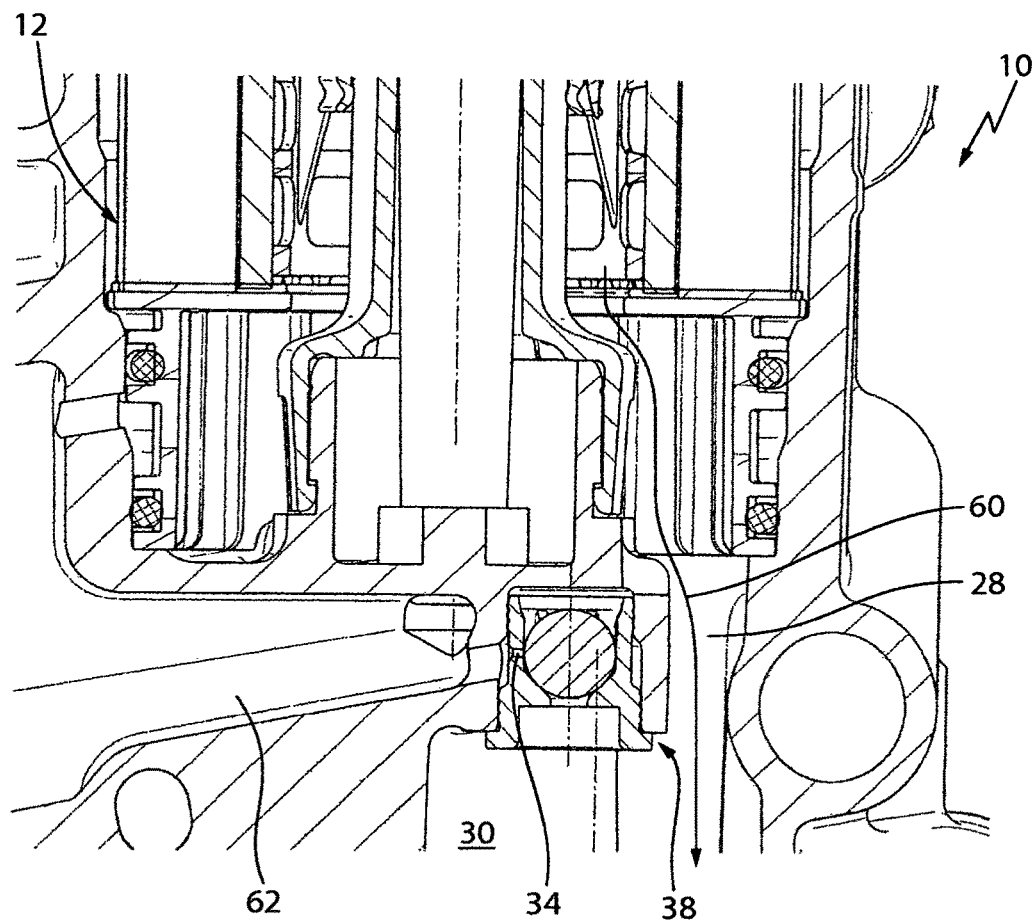
FIG. 4 is a section view of a third embodiment of a water separator with an overflow valve, wherein a valve seat of the overflow valve is formed in an insert member and a water collecting chamber through opening is extending adjacent to the overflow valve.

FIG. 4 shows a further water separator 10. The water separator 10 according to FIG. 4 corresponds to the water separator 10 according to FIG. 2. An arrow 60 indicates the path of the water separated by the separator element 12 into a water collecting chamber 30.

In contrast to the water separator 10 according to FIG. 2, a water collecting chamber through opening 28 does not extend through the overflow valve 38 but bypasses the overflow valve 38. Fuel which is backing up in the water collecting chamber 30 can therefore be displaced through the water collecting chamber through opening 28 upwardly to the separator element 12, wherein the indication "upward" is relative to the operating state of the water separator 10. On the other hand, water that is backing up in the water collecting chamber 30 is guided via drainage through opening 34 into a return line 62 which extends into a fuel tank (not shown).

In summarizing the above, the invention concerns a water separator, in particular in the form of a fuel filter for a motor vehicle. The water separator comprises a water collecting chamber. The water collecting chamber is closed off by an overflow valve relative to a drainage through opening. The overflow valve comprises a float that is lighter than water but heavier than fuel, in particular heavier than diesel fuel. The float rises as water is backing up in the water collecting chamber and opens the drainage through opening that is fluidically connected with the overflow valve and through which the backed-up water can drain. Fuel on the other hand does not open the overflow valve so that a drainage via the drainage through opening out of the water separator is realized only in case of water backing up so that the efficiency of the water separator is greatly improved. The drainage through opening is preferably fluidically connected with a fuel tank of the motor vehicle. For regular water discharge from the water collecting chamber, the latter is preferably connected with a water discharge device.

While specific embodiments of the invention have been shown and described in detail to illustrate the inventive principles, it will be understood that the invention may be embodied otherwise without departing from such principles.

What is claimed is:

1. A water separator for water contained in fuel, the water separator comprising:
 a water separator housing;
 a separator element arranged in the water separator housing;
 a water collecting chamber arranged in operation of the water separator axially below the separator element;
 a water collection chamber passage formed in the water separator housing, fluidically connecting the separator element to the water collecting chamber, the water collection chamber passage having:
  a first passage end arranged at the separator element and fluidically connected to a water separating gap of the separator element; and
  a second passage end arranged at and in fluid communication with in the water collection chamber;
 an overflow valve arranged in the water collection chamber passage, between the first passage end and the second passage end, the water collection passage extending through the overflow valve;
 wherein the overflow valve includes:
  a float ball arranged in a float ball chamber of the overflow valve;
  a first through opening, opening into the float ball chamber, the first through opening arranged axially below the float ball and in fluid communication with the water collection chamber;
  a water drainage opening, opening radially into the float ball chamber;
  wherein the float ball rests on a valve seat, closing the first through opening and closes the water drainage opening of the overflow valve member when a water filling level has not reached the overflow valve;
  wherein the float ball has a density that is lighter than water and heavier than diesel fuel, such that the water filling level reaching the overflow valve raises the float ball in the float ball chamber, thereby opening the water drainage opening of the overflow valve member to drain the excess water;
  wherein the float ball has a density heavier than diesel fuel, such the float ball sinks in diesel fuel, closing the water drainage opening of the overflow valve member;
  wherein the float ball has an average density that amounts to more than 700 kg/m$^3$ and less than 1,000 kg/m$^3$.

2. The water separator according to claim 1 wherein the average density of the float amounts to more than 819 kg/m$^3$.

3. The water separator according to claim 1, wherein the valve seat has a sealing surface,
 wherein a geometry of the sealing surface is complementary to an exterior side of the float ball.

4. The water separator according to claim 3, wherein the overflow valve is an insert member inserted into the water collection chamber passage of the water separator housing.

5. The water separator according to claim 4, wherein the water drainage opening is formed in the insert member.

6. The water separator according to claim 1, wherein the first through opening of the overflow valve comprises
 a cross-sectional surface area of less than 7 mm$^2$,
 a baffle, or
 a labyrinth.

7. The water separator according to claim 1 wherein the first through opening of the overflow valve comprises
 a combination of two or more of the elements selected from the group consisting of
 a cross-sectional surface area of less than 7 mm$^2$,
 a baffle, and
 a labyrinth.

8. The water separator according to claim 1 further comprising
 a water discharge device for at least partial drainage of water collected in the water collecting chamber.

9. The water separator according to claim 1 wherein the water separator comprises
 a fuel tank and
 a return line fluidically connected with the fuel tank,
 wherein the water drainage opening is fluidically connected with the return line.

10. The water separator according to claim 1 wherein the separator element comprises
 a screen pipe and
 a support pipe,
 wherein between the screen pipe and the support pipe the water separating gap is formed, and
 wherein the water separating gap is fluidically connected with the water collecting chamber through the water collection chamber passage.

* * * * *